Sept. 7, 1965 J. C. GOETTE 3,204,704
POWERED GARDEN TILLER AND ATTACHMENTS THEREFOR
Filed July 13, 1964 3 Sheets-Sheet 1

INVENTOR.
JOHN C. GOETTE
BY
Salvatore G. Militana,
attorney

Sept. 7, 1965  J. C. GOETTE  3,204,704
POWERED GARDEN TILLER AND ATTACHMENTS THEREFOR
Filed July 13, 1964  3 Sheets-Sheet 2
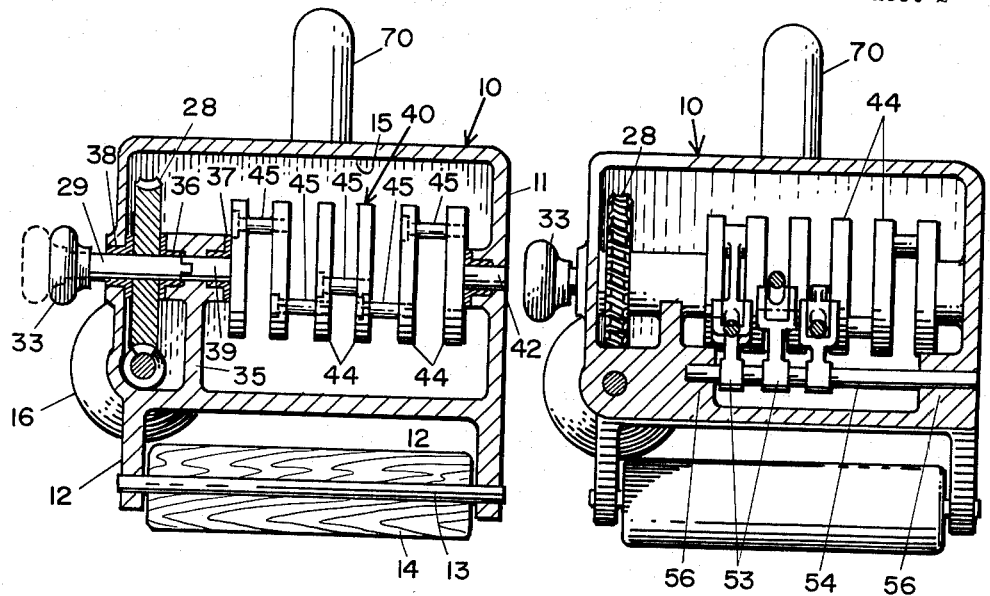
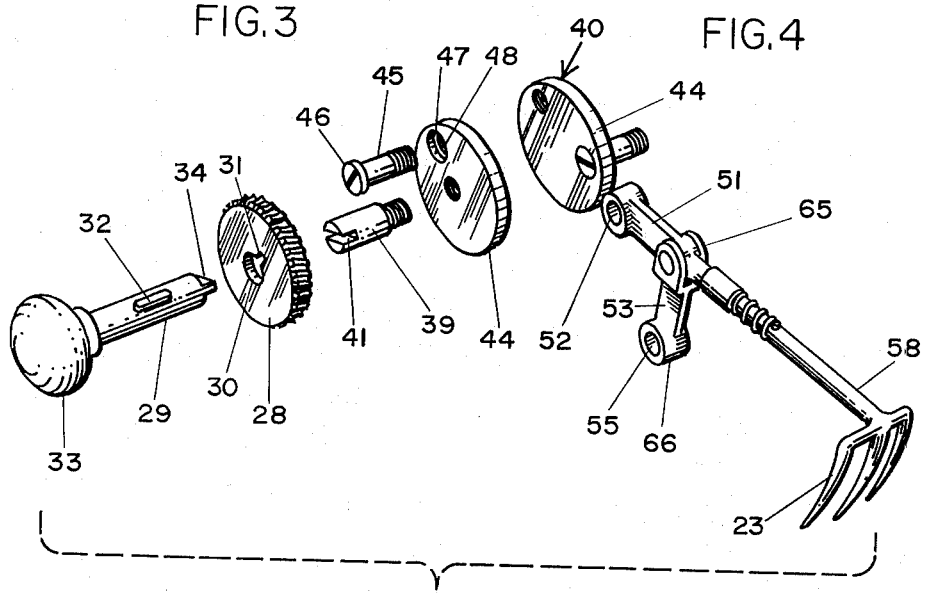
INVENTOR.
JOHN C. GOETTE Sept. 7, 1965  J. C. GOETTE  3,204,704
POWERED GARDEN TILLER AND ATTACHMENTS THEREFOR
Filed July 13, 1964  3 Sheets-Sheet 3
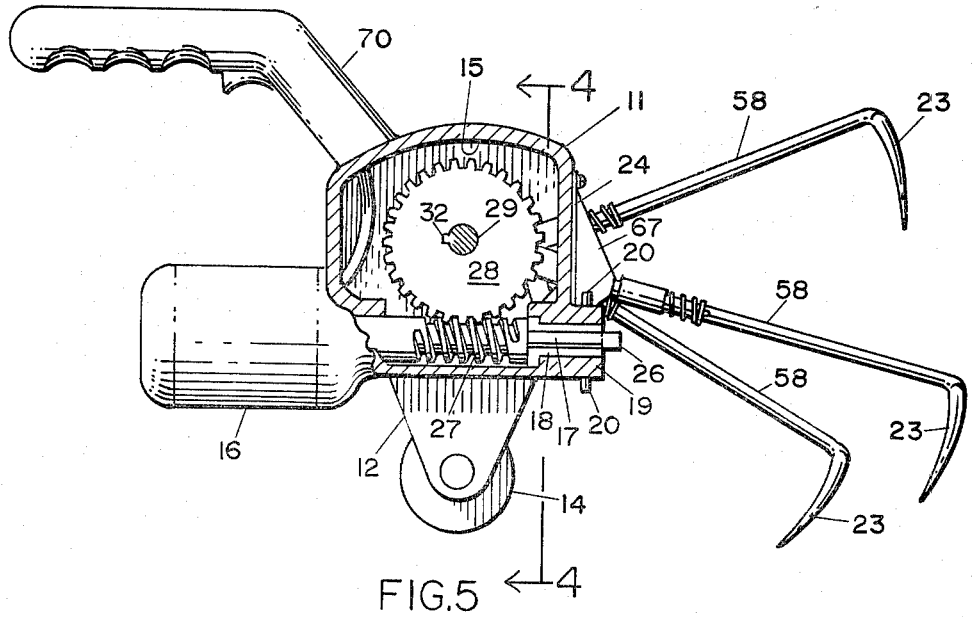
FIG.5
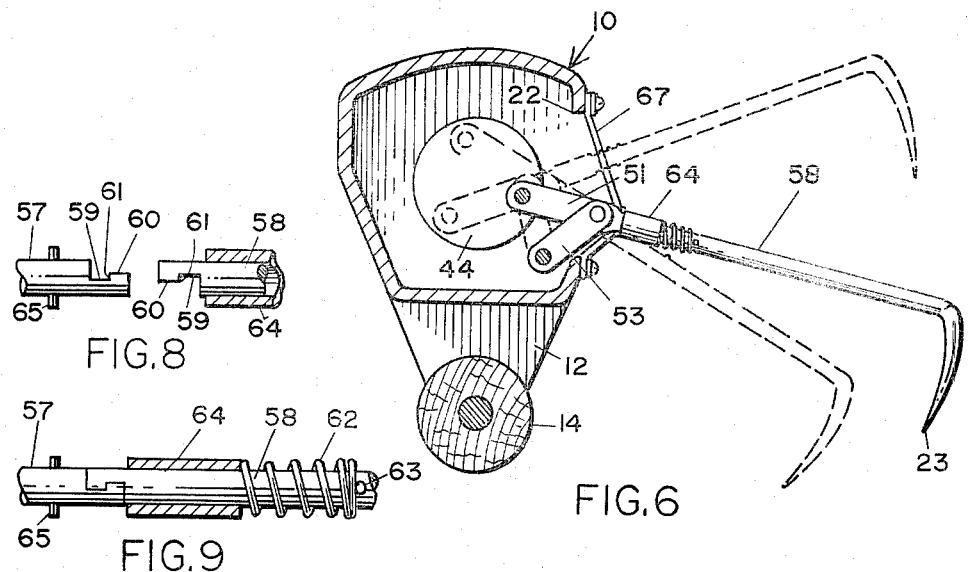
FIG.6
FIG.8
FIG.9
FIG.10
INVENTOR.
JOHN C. GOETTE
BY
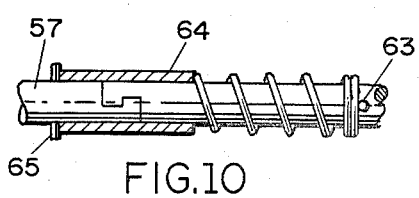

United States Patent Office 3,204,704
Patented Sept. 7, 1965

3,204,704
POWERED GARDEN TILLER AND
ATTACHMENTS THEREFOR
John C. Goette, 19610 NW. 39th Ave., Opa-locka, Fla.
Filed July 13, 1964, Ser. No. 382,096
3 Claims. (Cl. 172—84)

This invention relates to power tools and is more particularly directed to a powered garden tiller with attachments that may be used therewith.

A principal object of the present invention is to provide a powered tiller device which has a plurality of reciprocating tiller arms for tilling the earth as a person rolls the device.

Another object of the present invention is to provide a powered garden tiller which is simple in construction and operation and most effective in tilling the soil as well as being inexpensive in cost.

A further object of the present invention is to provide a powered garden tiller with a cam shaft to which tiller support arms are mounted for reciprocating movement of tillers to effect a tilling of the coil.

A still further object of the present invention is to provide a powered garden tiller whose tiller operating mechanism may be disengaged for the purpose of operating various attachments thereon.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departures from the salient features of the invention as expressed in the appended claims.

In the drawings:

FIGURE 3 is a longitudinal cross sectional view taken along the line 3—3 of FIGURE 2.

FIGURE 4 is a similar view taken along the line 4—4 of FIGURE 5.

FIGURE 5 is a side elevational view with the housing partially broken away.

FIGURE 6 is a similar view taken along the line 6—6 of FIGURE 2 showing the movement of a tiller arm.

FIGURE 7 is an exploded view of a portion of the cam mechanism and a tiller arm.

FIGURES 8, 9 and 10 show the steps in connecting a tiller arm to the device.

Figures 1, 2, 11:
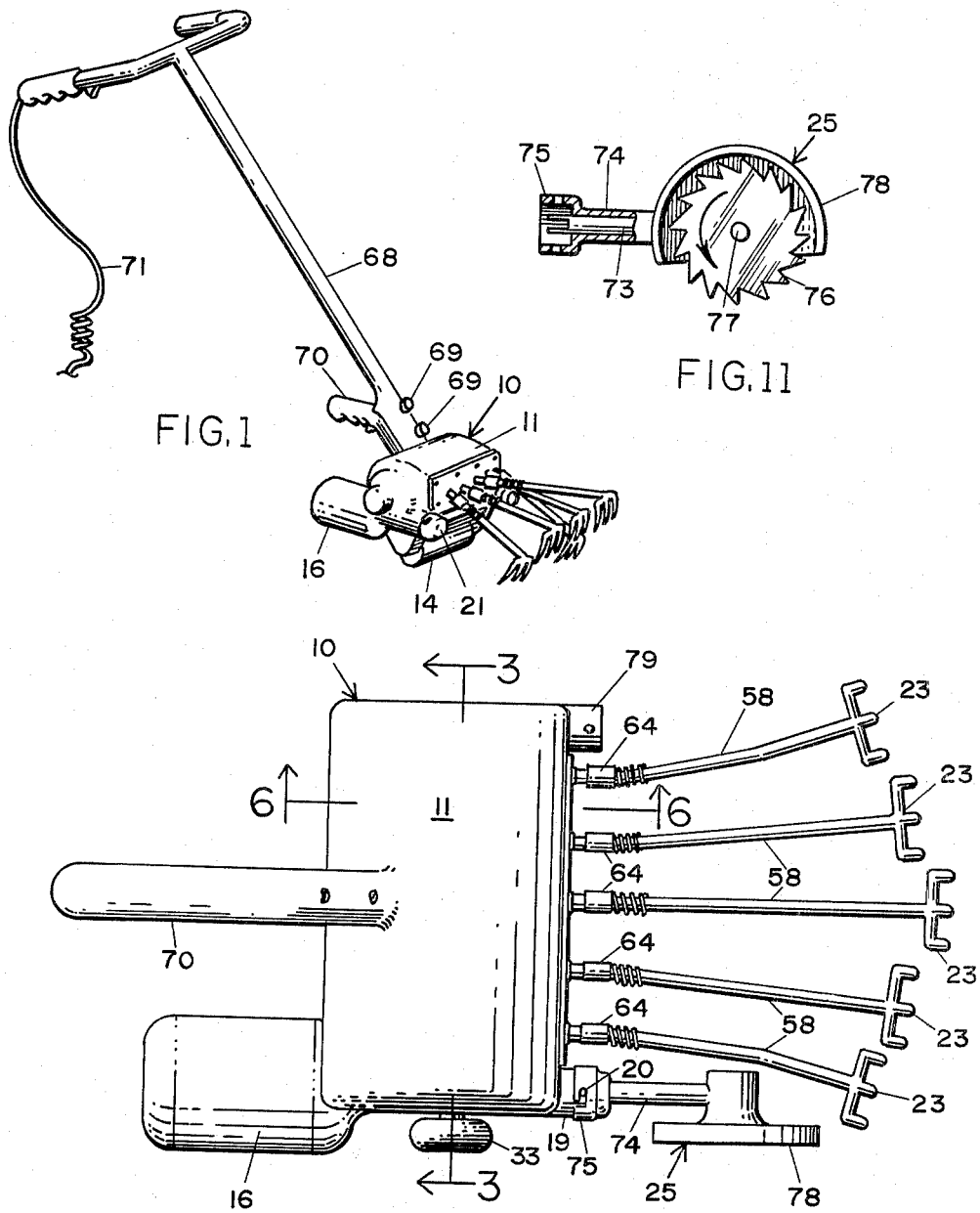
FIGURE 1 is a perspective view of a powered garden tiller constructed in accordance with my invention.
FIGURE 2 is a top plan view shown with the large handle removed.
FIGURE 11 is a side view of an edging attachment for my tiller device.

Referring to the drawings wherein like numerals are used to designate similar parts throughout the several views, the numeral 10 refers to my powered garden tiller consisting of a housing 11 having a chamber 15 in which the power transmission mechanism is contained as in explained in detail hereinafter, there being provided a pair of spaced apart depending flanges 12 extending below the housing 11. A rotatable shaft 13 that extends between the flanges 12 has a roller 14 rotatably mounted thereon to permit a person to roll the device 10 over the ground. The housing 11 is provided with an opening 22 on its front wall 24.

Mounted on the housing 11 at one side thereof is a motor 16 having its shaft 17 extending into the lower part of the chamber 15 and extending through the front wall 24 of the casing 11 where it is journalled in a bearing 18. A cylindrical bearing support member 19 is mounted on the outside of the housing 11 supporting the outer end of the bearing 18 and is provided with radially disposed pins 20, which permit a cap 21 to be removably mounted over the end of the shaft 17 when an attachment such as an edging device 25 has been removed therefrom.

The free end of the motor shaft 17 is provided with longitudinally disposed grooves or serrations 26.

At approximately the mid-portion of the motor shaft 17 is a worm 27 in mesh engagement with a worm wheel 28 which is mounted for rotation on a stub shaft 29. The shaft 29 is slidably mounted in a center bore 30 of the worm wheel 28. A slot 31 that is formed in the bore 30 receives a key 32 mounted on the shaft 29 thereby compelling the shaft 29 and the worm wheel 28 to rotate in unison but permits the shaft 29 to slide longitudinally with relation to the worm wheel 30. A knob 33 is mounted on the outer end of the shaft 29 for actuating the shaft 29 while at the other end there is a tongue member 34. A bearing 38 mounted in the side wall of the casing 11 receives the shaft 29. An inner wall 35 extends upwardly in the chamber 15 supporting bearings 36 and 37. Bearing 36 receives the inner end of the stub shaft 29 while the bearing 37 rotatably supports an end shaft 39 of the cam shaft 40. The end shaft 39 is provided with a slot 41 which is engaged by the tongue 34 when it is desired that the worm wheel 28 compel the rotation of the cam shaft 40.

At the other end of the cam shaft 40 is a further stub shaft 42 journalled in a bearing 43 that is mounted in the outer side wall of the casing 11, and between the stub shafts 39 and 42 is a plurality of cam discs 44 secured together by pins 45. The pins 45 maintain the adjacent cam discs 44 in spaced relation by means of an enlarged head 46 which engages a shoulder 47 in the bores 48 with the end threaded as at 49 that is threadedly received by a threaded bore 50 of the adjacent cam disc 44. The pins 45 are placed in staggered fashion between the cam discs 44.

Rotatably mounted on each of the pins 45 for reciprocating movement is a tiller arm support 51 provided with a bore 52 at one end for receiving the pin 45. The tiller arm support 51 is pivoted to one end 65 of a link 53 with the other end 66 of the link 53 rotatably mounted on a shaft 54 and having a bore 55 for receiving a shaft 54. The shaft 54 has its ends mounted as at 56 on the casing 11 and the inner wall 35. As best shown by FIGURE 8, the free ends 57 of the tiller arm supports 51 are provided with a quick release member for securing the tiller arm supports 51 to a tiller arm 58 at whose end a fork-like tiller 23 is mounted. Both the tiller arms 58 and the free end 57 of the supports 51 are provided with a shallow slotted portion 60 at the ends thereof and a deep slotted portion 59 adjacent thereto to form shoulders 61 which interengage as shown by FIGURES 9 and 10. A slidable sleeve 64 locks the interengaged members 57 and 58 together. A coil spring 62 having one end bear against the ends of a stop pin 63 that extends through the tiller arm 58 and the other end bearing against the end of the slidable sleeve 64 to yieldingly urge the sleeve to slide over the interengaged members 65 and 58 and bear against the ends of a stop pin 65 mounted on the free end 57 of the tiller arm support 51. The tiller arm supports 51 extend through a pliable cover 67 which extends across the opening 22 and is fastened along its edges to the front wall 24 of the casing 11. The tiller arms 58 have the fork-like tiller 23 mounted on the ends thereof. To permit the easy rolling of the tiller 10 along the ground, a long handle 68 is removably fastened by bolts 69 to a short handle 70 that is constructed integrally with the casing 11.

Both handles 68 and 70 are provided with switches 72 that are connected to the wire connection 71 for providing electricity to the motor 16.

As shown by way of illustration, the edging device 25 may be used in conjunction with the tillers 58 so that the edge of the ground being tilled may be cut in a straight line. The edger 25 consists of a shaft 73 rotatably mounted in a housing 74 at whose outer end a cap-like coupler 75 is mounted for fastening to the support member 19 on the front wall 24 of the housing 11. The edger 25 is provided with the usual cutting disc 76 mounted on a shaft 77 which is geared to rotate with the shaft 73. A hood 78 surrounds the upper portion of the cutting blade 76 to prevent dirt, stones, etc. that are engaged by the blade 76 from injuring the person using the tilling device 10. At the opposite end of the front wall 24 of the casing 11 is a support member 79 mounted thereon. The support member 79 is of the same shape and size a sthe support member 19 except that no shaft extends through the member 79. The latter is provided with a pin 80 for receiving a coupler similar to the coupler 75. As an example, if a hedging device were to be used on the garden tiller 10, the tiller arms 58 are removed from the device 10 and the hedger mounted on the supporting members 19 and 79. The hedger receiving its power from the shaft 17 while the cam mechanism 40 is disengaged as is explained hereinafter.

In the normal use of the powered garden tiller 10 without any attachments thereon, the knob 33 is pushed inwardly to compel the tongue 34 on the end of the shaft 29 to engage the slot 41 of the end shaft 39. Now when the wire 71 is connected to a source of electricity, the motor 16 will rotate the worm 27 which in turn will cause the worm wheel 28 to rotate. The shaft 36 will transmit the rotational force to the shaft 39 causing the cam discs 44 to rotate. Each of the tiller arms 58 will now reciprocate in a vertical plane following the path of movement shown by FIGURE 6. The tiller heads 23 bites into the earth as the tiller arms 58 swing downwardly to their lowermost position and as the tiller device 10 is being rolled over the ground. If it is desired to have an even cut made on the edge of the ground being tilled, the cap 21 is removed and the edging device 25 is mounted thereon. Now the cutting blade 76 will cut a straight edge along the area being simultaneously tilled by the tiller heads 23.

What I claim as new and desire to secure by Letters Patent of the United States is:

1. A powered garden tiller comprising a housing having a chamber and an opening, roller means mounting said housing for movement over the ground, a motor mounted on said housing having a shaft extending into said chamber, a worm mounted on said shaft, a worm gear in mesh engagement with said worm, an inner wall mounted in said chamber, a shaft mounting said worm gear and extending through a wall of said housing and supported on said inner wall, said worm gear shaft having a key, said worm gear having a slot receiving said key and permitting the slidable movement of said shaft, a knob mounted on the outer end of said shaft for sliding said shaft, crankshaft means having a stub shaft supported by said inner wall and a wall of said housing rotatably mounting said crankshaft means in alignment with said worm gear shaft, one of said stub shafts having a slot, a tongue mounted on said worm gear shaft and received by said slot for transmitting rotational movement of said worm wheel to said crankshaft means, a plurality of tiller support members rotatably mounted on one end to said crankshaft means and the other end extending through said opening in said housing, a link supporting shaft mounted in said chamber, a plurality of links connected at one end to said last named shaft and at the other end to said tiller support members adjacent said other end, and ground tilling means removably secured to said other end of said support members whereby upon actuation of said motor said tilling means will oscillate in a vertical plane.

2. A powered garden tiller comprising a housing having a chamber and an opening, roller means mounting said housing for movement over the ground, a motor mounted on said housing having a shaft extending into said chamber and through a wall of said housing, means mounted on the free end of said motor shaft for connecting an attachment to said shaft, a worm mounted on said motor shaft, a worm gear in mesh engagement with said worm, an inner wall mounted in said chamber, a shaft mounting said worm gear and extending through a wall of said housing and supported on said inner wall, said worm gear shaft having a key, said worm gear having a slot receiving said key and permitting the slidable movement of said shaft, a knob mounted on the outer end of said shaft for sliding said shaft, crankshaft means having a stub shaft supported by said inner wall and a wall of said housing rotatably mounting said crankshaft means in alignment with said worm gear shaft, one of said stub shafts having a slot, a tongue mounted on said worm gear shaft and received by said slot for transmitting rotational movement of said worm wheel to said crankshaft means, a plurality of tiller support members rotatably mounted on one end to said crankshaft means and the other end extending through said opening in said housing, a link supporting shaft mounted in said chamber, a plurality of links connected at one end to said last named shaft and at the other end to said tiller support members adjacent said other end, and ground tilling means removably secured to said other end of said support members whereby upon actuation of said motor said tilling means will oscillate in a vertical plane.

3. A powered garden tiller comprising a housing having a chamber and an opening, roller means mounting said housing for movement over the ground, a motor mounted on said housing having a shaft extending into said chamber and through a wall of said housing, means mounted on the free end of a said motor shaft for connecting an attachment to said shaft, a worm mounted on said motor shaft, a worm gear in mesh engagement with said worm, an inner wall mounted in said chamber, a shaft mounting said worm gear and extending through a wall of said housing and supported on said inner wall, said worm gear shaft having a key, said worm gear having a slot receiving said key and permitting the slidable movement of said shaft, a knob mounted on the outer end of said shaft for sliding said shaft, crankshaft means having a stub shaft supported by said inner wall and a wall of said housing rotatably mounting said crankshaft means in alignment with said worm gear shaft, one of said stub shafts having a slot, a tongue mounted on said worm gear shaft and received by said slot for transmitting rotational movement of said worm wheel to said crankshaft means, a plurality of tiller support members rotatably mounted on one end to said crankshaft means and the other end extending through said opening in said housing, a link supporting shaft mounted in said chamber, a plurality of links connected at one end to said last named shaft and at the other end to said tiller support members adjacent said other end, ground tilling means, and means releasably securing said other end of said support members to said ground tilling means whereby upon actuation of said motor said ground tilling means will oscillate in a vertical plane.

References Cited by the Examiner

UNITED STATES PATENTS

| 500,109 | 6/93 | Barclay | 172—56 |
|---|---|---|---|
| 1,827,074 | 10/31 | Ditlevsen | 172—84 XR |
| 2,544,747 | 3/51 | Bolongaro | 172—42 XR |
| 2,580,936 | 1/52 | Lytle | 172—42 XR |

FOREIGN PATENTS 644,654  10/50  Great Britain.

ABRAHAM G. STONE, *Primary Examiner*.